United States Patent [19]
Hindle et al.

[11] Patent Number: 5,649,361
[45] Date of Patent: Jul. 22, 1997

[54] METHOD OF MAKING AN HEAT EXCHANGER HAVING A COMPRESSION FITTING WITH A LOAD BEARING RING

[75] Inventors: Clive R. Hindle, Fort Worth; Akio Fukata, Grapevine, both of Tex.

[73] Assignee: Zexel USA Corporation, Decatur, Ill.

[21] Appl. No.: 325,708

[22] Filed: Oct. 19, 1994

[51] Int. Cl.⁶ .................................................. B23P 15/26
[52] U.S. Cl. ............................... 29/890.047; 29/890.054
[58] Field of Search .................... 29/890.054, 890.47, 29/890.052; 228/183; 285/354

[56] References Cited

U.S. PATENT DOCUMENTS

| | | | |
|---|---|---|---|
| 2,284,365 | 5/1942 | Briegel . | |
| 2,354,538 | 7/1944 | Parker . | |
| 2,431,120 | 11/1947 | Howe . | |
| 3,635,502 | 1/1972 | Burkhalter, Jr. . | |
| 4,005,884 | 2/1977 | Drori . | |
| 4,822,082 | 4/1989 | Phillipps . | |
| 4,878,697 | 11/1989 | Henry . | |
| 4,951,371 | 8/1990 | Dalo et al. | 29/890.054 |
| 5,131,689 | 7/1992 | Bates . | |
| 5,251,374 | 10/1993 | Halstead et al. | 29/890.054 |
| 5,419,042 | 5/1995 | Kado | 29/890.054 |

*Primary Examiner*—Irene Cuda
*Attorney, Agent, or Firm*—James E. Bradley

[57] ABSTRACT

A method and apparatus provide a heat exchanger having a compression fitting for sealing connecting a refrigerant flow line to a tube brazed to the heat exchanger in a brazing furnace. The heat exchanger compression fitting includes a female tubing connector, a male tubing connector, a stainless steel washer, an annular seal member, and a rib formed integrally into the tube, spaced apart from an end of the tube to which the refrigerant flow line is to be connected. The male tubing connector is brazed to the refrigerant flow line. The female tubing connector and the stainless steel washer are placed on the tube between the rib and the end of the tube which is to be brazed to the heat exchanger, with the stainless steel washer between the rib and the female tubing connector.

The tube is then placed in a refrigerant port of the heat exchanger, and run through the brazing furnace with other heat exchanger components. The annular seal member is placed around the pilot portion of the tube, next to the rib. The female tubing connector and the male tubing connector are coupled together to squeeze the annular seal member between the rib, the pilot portion of the tube, and the male tubing connector. The stainless steel washer evenly distributes compressive loads over a side of the rib, and prevents galling and deformation of the rib as the female connector is rotated for coupling to the male tubing connector.

6 Claims, 1 Drawing Sheet

METHOD OF MAKING AN HEAT EXCHANGER HAVING A COMPRESSION FITTING WITH A LOAD BEARING RING

BACKGROUND OF THE INVENTION

1. Field of the Invention

This invention relates in general heat exchangers for use in motor vehicle air conditioning systems having compression fittings, and in particular to a heat exchanger having a compression fitting which includes a tubing connector formed of materials which may be run through a brazing furnace for brazing to other components of the heat exchanger.

2. Description of the Prior Art

Prior art motor vehicle heat exchangers, such as condensers, have been fabricated by forming various condenser components of aluminum alloy materials having a brazing clad. In one type of heat exchanger, these components include two header tanks which are aligned in a parallel arrangement, flow tubes which extend in parallel between the two header tanks, and fins which are placed between the tubes for enhancing the heat transfer capacity of the flow tubes. These various condenser components are typically assembled and secured to an assembly fixture to form a condenser brazing assembly, which is run through a brazing furnace to sealingly secure the various condenser components together.

Frame elements, brackets and some refrigerant flow connectors, for passing refrigerant to and from the condenser, are also included in the condenser assembly and run through the brazing furnace. However, some types of prior art refrigerant flow connectors cannot be passed through the brazing furnace without threatening the integrity of the seal they are intended to provide. One such type of prior art flow connectors includes "tube-o" connectors used in compression fittings for connecting refrigerant flow lines to the condenser, such as for passing refrigerant from the system compressor to the condenser. A tube having a tube-o connector for connecting a condenser to a refrigerant flow line is brazed to the condenser as a separate assembly step which occurs after the condenser assembly is passed through the brazing furnace.

Prior art tube-o connectors are typically formed on tubes which are made from an aluminum alloy. A rib is formed into the tube, close to an outer end of the tube, with the rib an integral part of the tube. A pilot portion of the tube extends between the rib and the outer end of the tube. The rib includes two opposite, substantially parallel sides, an outer side and an inner side. The outer side of the rib is herein defined as the side of the rib closest to the outer end of the tube to which the refrigerant flow line is connected, and the inner side of the rib is herein defined as the side of the rib from which the tube extends to connect to the condenser.

A compression fitting incorporating a tube-o connector typically includes a female tubing connector, a male tubing connector, and an annular seal member, such as an elastomeric o-ring. The female tubing connector is placed around a portion of the tube which is to extend between the rib and the condenser. The male tubing connector is sealingly secured to the end of a refrigerant flow line to be connected to the tube. The annular seal member is placed around the pilot end of the tube, next to the rib. The male and female tubing connectors are threaded for coupling together, and squeezing the rib and annular seal member together with a compression load.

The female tubing connector includes a shoulder for pressing against the inner side of the rib to both locate the female tubing connector with respect to the outer end of the tube, and to apply the compression load to the rib. The male tubing connector presses against the annular seal member. The compression fitting is made up by screwing the female and male tubing connectors together, to press the annular seal member and the rib together with the compression load. This squeezes the annular seal member between the rib, the tube and the male tubing connector to seal between the tube and the refrigerant flow line.

The sealing integrity of a tube-o connector for use in this type of compression fitting is compromised when passed through a brazing furnace. The tube-o connector is typically formed from an aluminum alloy. Prior to passing through the brazing furnace, the tube-o connector has been hardened by methods determined according to the alloy selected to improve the mechanical strength of the aluminum alloy. These methods include solution hardening, age hardening, work hardening and other appropriate methods. After passing through the brazing furnace, the aluminum alloy is annealed which reduces the mechanical strength of the aluminum alloy. The tube-o connector becomes too soft and ductile for the female tubing connector to press against during makeup with the male tubing connector.

Passing the shoulder of the female tubing connector along the inner side of the rib of a softened tube-o connector will often result in galling and gouging of the rib. This results in deformation of the entire rib, which destroys the sealing integrity of the tube-o connector. Thus, an extra assembly step is required to braze a tube having a prior art tube-o connector to a condenser after the condenser is passed through a brazing furnace.

SUMMARY OF THE INVENTION

A method and apparatus provide a heat exchanger having a compression fitting for sealing connecting a refrigerant flow line to a tube brazed to the heat exchanger in a brazing furnace. The heat exchanger compression fitting includes a female tubing connector, a male tubing connector, a stainless steel washer, an annular seal member, and a rib formed integrally into the tube, spaced apart from an end of the tube to which the refrigerant flow line is to be connected. The male tubing connector is brazed to the refrigerant flow line. The female tubing connector and the stainless steel washer are placed on the tube between the rib and the end of the tube which is to be brazed to the condenser, with the stainless steel washer between the rib and the female tubing connector.

The tube is then placed in a refrigerant port of the condenser, and run through the brazing furnace with other condenser components. The annular seal member is placed around the pilot portion of the tube, next to the rib. The female tubing connector and the male tubing connector are coupled together to squeeze the annular seal member between the rib, the pilot portion of the tube, and the male tubing connector. The stainless steel washer evenly distributes compressive loads over a side of the rib, and prevents galling and deformation of the rib as the female connector is rotated for coupling to the male tubing connector.

DETAILED DESCRIPTION OF THE INVENTION

Figure 1:
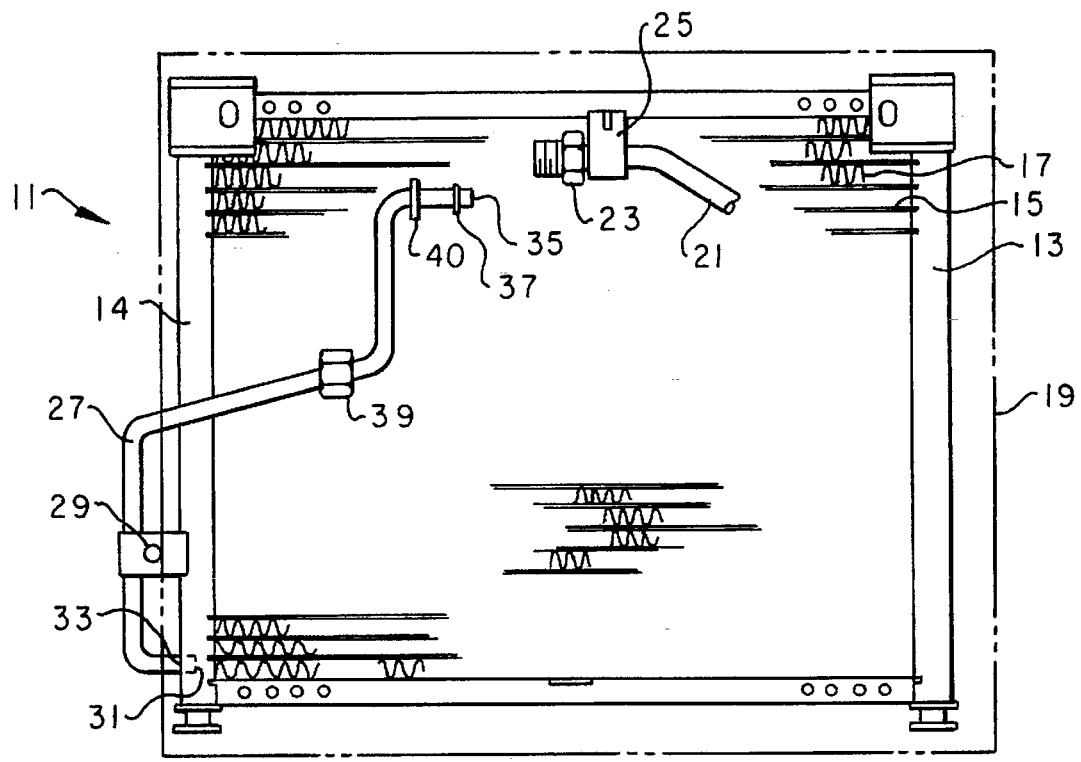
FIG. 1 is a side-elevational view of a condenser assembly according to the present invention.

FIG. 1 is a side-elevational view depicting condenser 11 for use as a heat exchanger in a motor vehicle air conditioning system. Condenser 11 is shown in a fully assembled condition, after all of the condenser components have been brazed together. Condenser 11 includes headers 13 and 14, flow tubes 15, and fins 17. Condenser 11 is secured to assembly fixture 19, which is shown in phantom. Condenser 11 includes outlet tube 21 which extends from header 13, and has an outer end to which male tubing connector 23 is secured.

Bracket 25 holds the outer end of outlet tube 21 to a frame of condenser 11. Inlet tube 27 is secured to header 14 by bracket 29. Inlet tube 27 has inner end 31 which extends into refrigerant port 33 of header 14. Outer end 35 of inlet tube 27 is opposite inner end 31. Rib 37 extends around inlet tube 27, proximate to outer end 35. Female tubing connector 39 is secured around tube 27. Annular ring 40 is a stainless steel washer which extends around tube 27, between rib 37 and female tubing connector 39.

Condenser 11 is formed of aluminum alloy materials having a brazing clad. Inlet tube 27 is formed from a suitable metal alloy selected for passing through a brazing furnace and brazing to condenser 11, such as an aluminum alloy. In the preferred embodiment, tube 27 is formed from aluminum alloy A3003, and does not include a brazing clad. Female tubing connector 39 is formed of an aluminum alloy, which once annealed, becomes harder after prolonged periods of exposure of ambient conditions. Female tubing connector 39 will reach 80% of the initial hardness it had prior to running through the brazing furnace after exposure to ambient conditions for one week.

Figure 2:
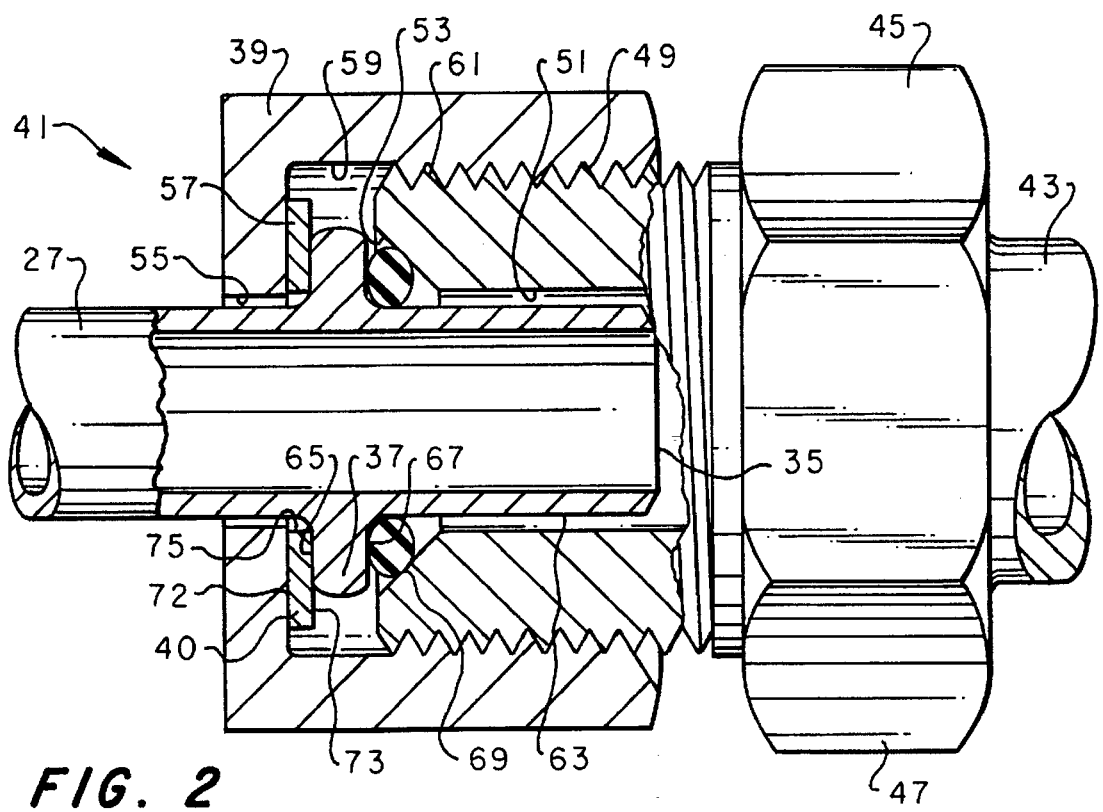
FIG. 2 is a partial sectional view of a heat exchanger compression fitting according to the present invention.

FIG. 2 is a partial sectional view depicting heat exchanger compression fitting 41 of the preferred embodiment of the present invention. Compression fitting 41 is for securing flow line 43, such as a refrigerant flow line from a compressor, to tube 27. Flow line connector 45 is a male tubing connector, similar to connector 23 shown in FIG. 1. Flats 47 extend around an exterior surface of connector 45 for securing a wrench to connector 45. It should also be noted that flats are also included on female tubing connector 39, as shown in FIG. 1. External threads 49 extend around an end portion of flow line connector 45. Bore 51 extends integrally into flow line connector 45. An outermost end of bore 51 includes tapered seating surface 53.

Female tubing connector 39 has an internal bore 55 for passing around tube 27. Shoulder 57 extends radially outward from internal bore 55, integrally within tubing connector 39. Large bore 59 extends from shoulder 57 within female tubing connector 39 and includes internal threads 61 for threadingly securing female tubing connector 39 to flow line connector 45. Tube 27 extends with outer end 35 and rib 37. Rib 37 is spaced apart from outer end 35 to provide pilot 63, which extends for a preselected distance range between rib 37 and outer end 35. The preselected distance range for pilot 63 is provided to have a minimum distance for providing an adequate seal surface around tube 27. The preselected distance range has a maximum distance so that outer end 35 will not extend into flow line connector 45 to far and interfere with makeup of compression fitting 41.

Rib 37 has a first surface 65 which faces shoulder 57 of female tubing connector 39. Rib 37 also includes a second surface 67, which is opposite first surface 65, and faces outer end 35. First surface 65 and second surface 67 are parallel, and extend radially outward from tube 27, perpendicular to the outer circumference of tube 27. Rib 37 also has a sufficient thickness to prevent shearing and deformation of rib 37 as compressive loads are applied thereto during makeup of compression fitting 41.

Annular seal member 69 is provided by an o-ring which continuously extends around pilot 63, between second surface 67 of rib 37, and tapered seating surface 53 formed into bore 51 of flow line connector 45.

Annular ring 40 provides a load bearing means, which in the preferred embodiment of the present invention is a stainless washer. Annular ring 40 extends between shoulder 57 of female tubing connector and first surface 65 of rib 37. Annular ring 40 includes a flat side 72 for mating against shoulder 57, and flat side 73 for mating against first surface 65 of rib 37. Hole 75 extends through annular ring 40 to allow annular ring 40 to slide along the length of tube 27. Annular ring 40 is formed from a material which will not braze to tube 27 and rib 37, and which will remain hard and not deform as it passes through a brazing furnace in which the various components for condenser 11 are brazed together. In this embodiment of the present invention, annular ring 40 is formed from stainless steel, and it has the shape of a flat washer.

Operation to assemble and braze condenser 11, and make up compression fitting 41 is now described with reference to FIGS. 1 and 2. Components for condenser 11 are assembled and temporarily secured to assembly fixture 19 for passing through a brazing furnace. These components includes headers 13, 14, flow tubes 15, fins 17, outlet tube 21, male tubing connector 23, bracket 25, tube 27, bracket 29, female tubing connector 39 and annular ring 40. Female tubing connector 39 and annular ring 40 extend around tube 27 between rib 37 and inner end 31. Inner end 31 of tube 27 is secured to assembly fixture 19 so that it extends into refrigerant port 33. The components for condenser 11 are then passed through a brazing furnace to braze the components of condenser 11 together into an singular unit.

After removing condenser 11 from the brazing furnace, compression fitting 41 may now be made up. It should be noted that typically condenser 11 is not installed into a motor vehicle air conditioning system until some time after condenser 11 has been brazed together into an singular unit. Typically, this period of time extends more than one week and female tubing connector 39 will harden to at least 80% of the initial hardness it had prior to passing through the brazing furnace. However, condenser 11 is usually pressure tested to determine whether condenser 11 is adequately brazed to seal refrigerant therein soon after condenser 11 is passed through the brazing furnace. Thus, make up of compression fitting 41 may be either to pressure test condenser 11, or for final assembly into a motor vehicle as part of a motor vehicle air-conditioning system.

Heat exchanger compression fitting 41 is made up by first placing annular seal member 69 around pilot 63 of tube 27. Annular seal member 69 is placed adjacent to second surface 67 of rib 37. Bore 51 of flow line connector 45 is then passed over pilot 63 until tapered seating surface 53 presses against seal member 69. Annular ring 40 is then held in place against first surface 65 of rib 37, and female tubing connector 39 slides over tube 27 until threads 61 engage threads 49. Female tubing connector 39 is rotated around tube 27 and flow line connector 45 to make up internal threads 61 with external threads 49 to threadingly secure female tubing connector 39 to flow line connector 45. Female tubing connector 39 is rotated until shoulder 57 presses against flat side 72 of annular ring 40.

Further rotation of female tubing connector 39 applies a compressive load which squeezes annular ring 40, rib 37 and annular seal member 69 between female tubing connector 39 and flow line connector 45. Connectors 39 and 45 are made up until annular seal member 69 is squeezed with a large enough compressive load to sealingly engage between tapered seating surface 53, an exterior circumferential surface of pilot 63, and second surface 67 of rib 37. The compressive load applied to annular seal member 69 is also applied to rib 37 by shoulder 57 of female tubing connector 39 pressing into flat side 72 of annular ring 40. The compression force is then passed from flat side 73 of annular seal ring 40 into first surface 65 of rib 37 and to tube 27.

Annular ring 40 acts as a load bearing means for evenly distributing the compressive load from shoulder 57 along first surface 65 of rib 37. This prevents galling and gouging of surface 65 which typically occurs when shoulder 57 of female tubing connector 39 slides around rib 37 with a compressive force acting on surface 65. Annular ring 40 is harder, and does not gouge softer surface 65 of rib 37, as would typically occur if softer surface 57 were sliding along the softened first surface 65 of rib 37.

The present invention provides advantages over prior art compression fittings. A tubing connector of a compression fitting according to the present invention may be passed through a brazing furnace with other condenser components for joining together into a singular unit. Thus, a later assembly step for separately brazing a tube to a header of the condenser is no longer required. The annular ring of the present invention provides a load bearing means for evenly distributing a compression load applied to a rib formed integrally into the tube. Even distribution of the compression load prevents galling and deforming of the rib as the compression fitting is made up, after the rib has passed through the brazing furnace. Further, the annular ring is formed from a dissimilar material than the metal alloy from which the tube-o fitting is formed. The annular ring is harder than the tube-o fitting, which reduces friction when moving along a flat surface of the tube-o connector, and prevents galling.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. A method for fabricating a heat exchanger for use in a motor vehicle air conditioner having a compression fitting for sealingly connecting a tube extending from the heat exchanger to a flow line for passing refrigerant within the heat exchanger, the method comprising the steps of:

providing an assembly fixture and a heat exchanger assembly which includes headers, fins, flow tubes, a tubing connector, a load bearing ring, and a tube having a rib formed exteriorly thereon, the rib being spaced axially away from a connector end of the tube;

assembling the headers, fins, flow tubes, tube, and the tubing connector into a heat exchanger assembly, with the heat exchanger assembly secured to the assembly fixture, wherein a header end of the tube, opposite of the connector end, extends into a refrigerant port in one of the headers, and the tubing connector is disposed around the tube between the heat exchanger and the rib;

passing the heat exchanger assembly and assembly fixture through a brazing furnace to braze the heat exchanger assembly into a singular unit, with the tubing connector free to slide around the tube between the heat exchanger and the rib formed exteriorly around the tube;

placing an annular seal member around the tube between the rib and the connector end of the tube;

placing the load bearing ring next to a first side of the rib, wherein the load bearing ring extends around the tube between the rib and the tubing connector;

sliding the tubing connector along the tube, next to the load bearing ring, and into a position for engaging a flow line connector;

securing the tubing connector to the flow line connector, with a compression load applied to the annular seal member to squeeze the annular seal member into sealingly engaging between the tube and one of the tubing and flow line connectors; and wherein the load bearing ring evenly distributes the compression load over the rib, the compression load being applied by the tubing connector to the rib as the tubing connector is secured to the flow line connector.

2. The method for fabricating the heat exchanger of claim 1, further comprising the step of:

placing the load bearing ring around the tube and between the header end of the tube and the rib prior to running the heat exchanger assembly through the brazing furnace, and passing the load bearing ring through the brazing furnace with the heat exchanger assembly.

3. The method for fabricating the heat exchanger of claim 1, wherein the step of securing the tubing connector to the flow line connector comprises the step of:

rotating the tubing connector around the tube to threadingly secure the flow line connector into the tubing connector.

4. The method for fabricating the heat exchanger of claim 1, wherein the step of securing the tubing connector to the flow line connector comprises the step of:

rotating the tubing connector around the tube to screw the flow line connector into the tubing connector.

5. The method for fabricating the heat exchanger of claim 1, further comprises the step of:

placing the load bearing ring around the tube and between the header end of the tube and the rib prior to running the heat exchanger assembly through the brazing furnace, and passing the load bearing ring through the brazing furnace with the heat exchanger assembly; and wherein the step of securing the tubing connector to the flow line connector includes rotating the tubing connector around the tube to threadingly secure the flow line connector to the tubing connector.

6. The method for fabricating the heat exchanger of claim 1, further comprises the step of:

placing the load bearing ring around the tube and between the header end of the tube and the rib prior to running the heat exchanger assembly through the brazing furnace, and passing the load bearing ring through the brazing furnace with the heat exchanger assembly; and wherein the step of securing the tubing connector to the flow line connector comprises rotating the tubing connector around the tube to threadingly secure the flow line connector into the tubing connector.

\* \* \* \* \*